Figure 1:
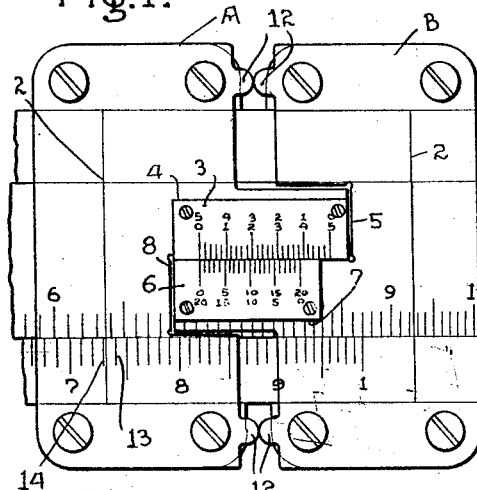

Sept. 15, 1925.

J. S. WOLLK

SLIDE RULE

Original Filed June 10, 1924

1,553,969

Inventor
Joseph S. Wollk.

By
Attorney

Patented Sept. 15, 1925.

1,553,969

UNITED STATES PATENT OFFICE.

JOSEPH S. WOLLK, OF NEW YORK, N. Y.

SLIDE RULE.

Application filed June 10, 1924, Serial No. 719,297. Renewed August 11, 1925.

*To all whom it may concern:*

Be it known that I, JOSEPH S. WOLLK, a citizen of the United States of America, residing at New York, in the county of New York and State of New York, have invented certain new and useful Improvements in Slide Rules, of which the following is a specification.

This invention relates to an improvement in slide rules, and more particularly to a bridge therefor, in the use of which the usual positive readings of the slide rule may be increased by at least two figures of positive reading; that is to say, the unknown and unexpressed hair-line indication beyond the final indicated division of the slide rule may be positively expressed in one or two additional figures, that is, to one or two additional places in the terms of the slide rule reading.

In the use of a slide rule with the ordinary bridge, the hair line in its indication for final reading is usually between two of the finer line divisions on the slide rule, and the reading beyond the final line division of the slide rule is ordinarily ignored. As this unknown measurement is a material part of the true result, it follows that if this usually unknown measurement can be positively expressed in figures of the slide rule measurement, the final result is that much nearer the true result, and hence the effectiveness of the slide rule is materially increased.

The bridge of the present invention is made of two independent sections arranged for limited relative movement and each carrying a vernier scale member of fine line divisions. This bridge is used as an entirety as is the ordinary bridge in setting the hair line for the proper reading. When the bridge is used as an ordinary bridge, the respective vernier scale members have a particular point, say the zero point on each, in coincidence. I reading the final number on the slide rule, it will be found for example, that the hair line is beyond one of the finer line divisions, thereby expressing a result which is greater than that indicated by the adjacent line division of the slide rule in the direction of reading. Under these conditions that section of the improved slide, which carries the hair line, is moved back to the final fine line division of the slide rule which indicates the final figure of the reading with the slide rule under ordinary conditions. As the vernier on the section of the bridge which has not been moved still remains in the position determined by the bridge, in its initial application for slide rule reading, this movement of the hair line section of the bridge will cause a movement of the vernier carried by such section laterally of the vernier carried by the section remaining fixed, and the relative reading on the two verniers will indicate the measurement in vernier reading of this unknown measurement on the slide rule. This may be expressed as a figure, say for example, 5. The bridge as an entirety is then adjusted and operated to determine the distance on the vernier reading between the two slide rule line readings, between which the hair line originally indicated an unknown measurement. This is accomplished by adjusting the bridge as an entirety, with the zero marks of the verniers in registry to cause the hair line to coincide with one of these slide rule divisions, and then the section of the slide rule carrying the hair line is moved independently of the other section to cause such hair line to coincide with the other line division of the slide rule. The vernier then expresses, in vernier reading, the distance between these two line divisions of the slide rule. Consider this for example to be indicated on the vernier reading as 25. This measurement 25 then, for example, expresses the full measurement of ten uniform divisions between the two line divisions on the slide rule being considered. If the reading 25 on the vernier equals ten divisions of slide rule measurement between the lines of division on the slide rule, each of said ten divisions would equal a reading of two and a half on the vernier. As the unknown measurement previously determined shows a reading of 5 on the vernier, and each of the ten division between the fine division lines on the slide rule equal two and a half on the vernier, the unknown measurement obviously equals 2 on the slide rule. If the vernier reading is 7, for example, in the measurement of the unknown slide rule reading, the second figure of the unknown reading is easily determined. The above is a general statement of the operation which will be more specifically described hereinafter in direct relation to the accompanying drawings.

The improved bridge further contemplates details of construction by which the bridge sections are initially held in absolute position relative to the slide rule, and such sections are fixed against other than a predetermined limit of relative movement; the respective vernier scales having direct and reverse readings, and each slide section having a hair line for convenience in the use of the bridge at the respective ends of the slide rule.

The invention is illustrated in the accompanying drawings, in which:

Fig. 1 is a plan view showing the improved bridge applied to a slide rule.

Figure 3:
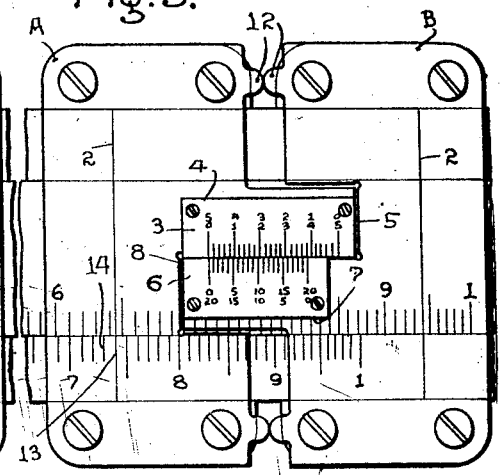
Figure 2:
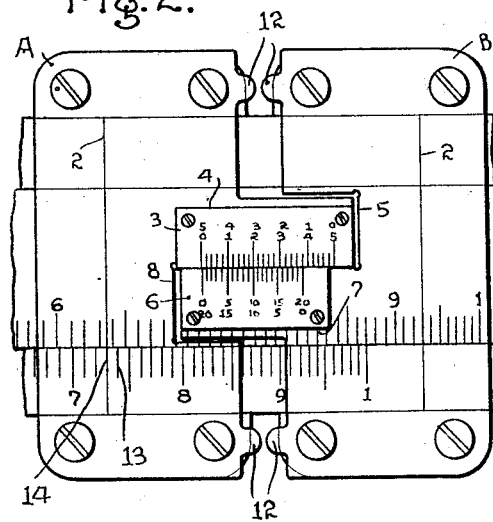
Figure 4:
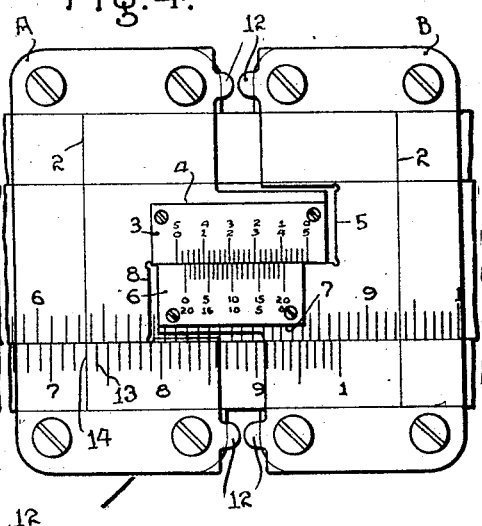

Figs. 2, 3, and 4, are similar views showing the relative positions of the bridge in determining actual measurements of the usual unknown measurement of the slide rule.

Figure 5:
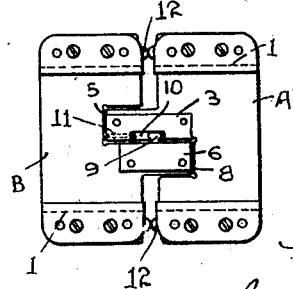

Fig. 5 is a bottom plan of the bridge.

The bridge is made in two sections A and B, each having the marginal edge portions 1 to slidably cooperate with the slide rule. For a purpose which will later appear, each of the sections A and B is provided with a hair line 2, and each section is further provided with a vernier scale. The vernier scale 3 of the section A is secured in a cut out portion 4 of the inner edge of such section, the opposing section B having its inner edge cut out at 5 to receive the end of the vernier scale 3 when the bridge sections are in normal or initially operative positions. The bridge section B has a vernier scale 6 set into a cut out portion 7 of the inner edge of this section B, and fitting into a cut out portion 8 of the inner edge of section A when the sections are together. The vernier scales 3 and 6 are divided with fine lines of division, each having a zero point, and one of said scales, as 3, having the major divisions successively numbered, while the other such scale, as 6, bears numbers indicating the minor divisions. These scales have their adjacent margins in contact so that the readings may be readily effected.

As stated, each bridge section has a hair line, and these hair lines are arranged adjacent the relatively outer edges of the sections, so that the appropriate hair line may be used when the bridge has been adjusted near the end of the slide rule, to avoid carrying the other section over beyond the end of the slide rule. These hair lines are further arranged adjacent the outer edges of the sections, so that when the lines coincide with the final divisions on the slide rule, the extreme outer edge of the bridge section will be inwardly of the adjacent free end of the slide rule, thus permitting convenient adjustment of the slide sections of the slide rule without interfering with the bridge.

As either bridge section may be used in determining slide rule measurement, it is apparent that the verniers 3 and 6 should have reverse measurements so as to be used for either end, and hence said verniers are shown as of double relatively reversed scale measurements, as clearly indicated in Fig. 1. Furthermore, the relative spreading movement of the respective slide sections must be limited accurately in vernier adjustment, and for this result, a projection 9 is provided on one of the verniers as 6, which projects into a recess 10 on the underside of the other vernier, as 3. When this projection 9 engages one end of the recess, the zero marks of the verniers are in registry and the verniers are in normal relation with the bridge sections in contact for normal use. The opposite wall of projection 9 is threaded to receive a set screw 11, which may be adjusted therein to engage the projection 9 in the opening or relative movement of the bridge sections, limiting this movement as desired.

It is further necessary to maintain absolute disposition of the hair lines at right angles to the slide rule, and as the vernier scales extend into recesses in the bridge sections, any accumulation of dust or dirt in such recesses would interfere with the proper relative positions of the bridge sections and might possibly change the position of the hair lines and interfere with the proper slide rule reading. To avoid this, the recesses receiving the free ends of the verniers are cut somewhat larger than necessary, and the end marginal edges of the bridge sections have rounded projections 12 adapted to contact in the normal positions of the sections A and B. Thus the point of contact is tangential to the sections, and hence absolutely accurate in their relative positions, while the comparatively enlarged recesses for the vernier scale sections prevent any accumulation of dust or dirt at these points.

In the use of the improved bridge, reference is had particularly to Figs. 1, 2, 3 and 4. Note from Fig. 1, that the hair line 2 of the section A indicates on the slide rule a main division numbered seven and the third minor division thereafter, which would be ordinarily read and will be hereinafter referred to as 73, and such hair line is beyond the third division of the slide rule, showing an unknown measurement in excess of the 3. In this position of the bridge, the zero marks of the verniers are in coincidence. Section A with the hair line is then moved until such hair line registers with the 3 division line on the slide rule, that is, with the line immediately adjacent the hair line and indicating the last positive reading on the slide rule, as shown in Fig. 2. With the section A adjusted so that the hair line is in coincidence with this final indicating line on the slide rule, the section B of the bridge meanwhile remaining in its original position, it is apparent that the respective verniers are moved relatively, and that the reading now expressed on these verniers indicates in vernier reading the unknown measurement on the slide rule as the bridge was originally positioned. Say for example that the vernier reading after this adjustment is 5. It is now necessary to determine the vernier reading for the distance between the two slide rule division lines in which the hair line in its original placement was located. This is accomplished in the following way. The bridge sections are moved together in normal relation, that is, with the zero marks on the verniers in coincidence and the hair line 2 of section A is first aligned with the division on the slide rule immediately beyond that occupied by the hair line in its original position as shown in Fig. 3, that is to say, the line indicated at 13. With section B of the bridge now held fixed, section A is moved to coincide the hair line 2 thereof with the slide rule division line on the opposite side of that position of the hair line in its original application, that is, the line marked 14, as shown in Fig. 4. The vernier then accurately expresses in vernier reading the distance between the lines 13 and 14, a portion of which distance is the unknown reading of the slide rule in the original position of the bridge, as indicated in Fig. 1. Assume for example that the vernier reading of the distance between the lines 13 and 14 on the slide rule is 25. If it is desired to express the unknown distance on the slide rule, in figures indicating a number of tenths or ten divisions between the lines 13 and 14, it will be apparent that the reading 25 on the vernier indicates ten such divisions, that is, one such division will indicate a reading of two and a half on the vernier. The unknown distance measurement on the slide rule has been found to correspond to a reading of 5 on the vernier, that is, two tenths of the distance between the slide rule scale lines 13 and 14. Therefore, the unknown reading on the slide rule is expressed by 2, which of course constitutes the next figure in the slide rule reading beyond those positively determined by the slide rule indications. If, for example, the unknown reading was 7 on the vernier, it is merely a matter of mechanical computation to find the second figure of the unknown reading.

Thus the improved bridge provides a simple convenient means by which the usual slide rule reading is positively increased at least two figures beyond that possible with the ordinary bridge. Obviously, either hair line may be used and either section become the manipulating section for determining the measurements. The duplication of hair lines is for convenience in using the bridge adjacent the respective ends of the slide rule without the necessity of extending the bridge so far beyond the end of such rule as to permit one or the other of the sections to leave the slide rule.

The bridge may be constructed of any usual or preferred material, and if desired, and as contemplated, the bridge may be provided with a magnifying section overlying the vernier and hair lines for accuracy in reading, this magnifying section not being illustrated as it is quite common in use with slide rule bridges.

The scales indicated at 3 and 6 and herein referred to as verniers, are merely fine line divisions having relation one to the other but having no vernier relation, as such is commonly understood to the divisions on the slide rule. The purpose of these so-called vernier scales is first to determine, according to the vernier scales, the unknown reading of the slide rule and then to determine the full reading on the slide rule of the distance between the two scale marks on the slide rule, between which the unknown reading occurs, and to determine the proportion of the unknown reading to the whole distance between such scale lines.

What I claim is:

1. A slide rule bridge made up of sections having a limited relative movement, each section having a vernier scale arranged for cooperative reading.

2. A bridge for slide rules, comprising independent sections, each having a vernier scale, means for limiting the relative movement of the sections, and a hair line provided on each section.

3. A bridge for slide rules, comprising independent sections, a hair line carried by one of the sections, cooperating vernier scales carried by the respective sections, and rounded meeting points of contact for the sections when the latter are arranged in normal bridge forming relation.

4. A slide rule bridge, comprising two sections, a vernier scale carried by each of the respective sections, the scales being arranged to remain in edge contact for cooperative reading in the adjustment of the sections, and means to limit the relative movement of the sections to a distance substantially equalling that of the maximum space between any two divisions on the slide rule.

5. A bridge for slide rules, comprising independent sections, a hair line carried by one of the sections, cooperating vernier scales carried by the respective sections, and rounded meeting points of contact for the sections when the latter are arranged in normal bridge forming relation, the zero marks of the vernier scales being in coincidence when said meeting points of contact are in engagement.

In testimony whereof I affix my signature.

JOSEPH S. WOLLK.